US010423530B2

(12) United States Patent
Tourrilhes et al.

(10) Patent No.: US 10,423,530 B2
(45) Date of Patent: Sep. 24, 2019

(54) PARTIAL CACHE COHERENCE

(71) Applicant: HEWLETT PACKARD ENTERPRISE DEVELOPMENT LP, Houston, TX (US)

(72) Inventors: Jean Tourrilhes, Palo Alto, CA (US); Michael Schlansker, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 102 days.

(21) Appl. No.: 15/589,164

(22) Filed: May 8, 2017

(65) Prior Publication Data
US 2018/0322058 A1    Nov. 8, 2018

(51) Int. Cl.
*G06F 12/0831* (2016.01)
*G06F 12/0815* (2016.01)
*G06F 12/0813* (2016.01)

(52) U.S. Cl.
CPC ...... *G06F 12/0835* (2013.01); *G06F 12/0813* (2013.01); *G06F 12/0815* (2013.01); *G06F 2212/1024* (2013.01); *G06F 2212/1041* (2013.01); *G06F 2212/154* (2013.01); *G06F 2212/621* (2013.01)

(58) Field of Classification Search
CPC ............. G06F 12/0835; G06F 12/0815; G06F 2212/621; G06F 2212/60
See application file for complete search history.

(56) References Cited

U.S. PATENT DOCUMENTS

| 6,944,719 | B2 | 9/2005 | Rowlands et al. |
| 8,131,941 | B2 | 3/2012 | Kinter |
| 9,372,752 | B2 | 6/2016 | Das Sharma et al. |
| 2003/0009637 | A1 | 1/2003 | Arimilli et al. |
| 2004/0117562 | A1 | 6/2004 | Wu et al. |

(Continued)

FOREIGN PATENT DOCUMENTS

WO    WO-2013063484 A1    5/2013

OTHER PUBLICATIONS

Fatourou, P. et al., "Distributed Data Structures for Future Many-core Architectures," (Research Paper), Jan. 23, 2017, 141 pages, available at https://pdfs.semanticscholar.org/d4be/12b6f73d80f490c8d802633678bc7c20b8e3.pdf?_ga=1.102399749.541565873.1471844980.

(Continued)

*Primary Examiner* — Tasnima Matin
(74) *Attorney, Agent, or Firm* — Hewlett Packard Enterprise Patent Department

(57) ABSTRACT

Examples disclosed herein relate to partial cache coherence. In some examples disclosed herein, a node connected to a memory fabric may include local cache connected to a local processor and a memory coherency proxy to. The memory coherency proxy may configure a portion of a fabric memory on the memory fabric as a proxy backing memory and expose the proxy backing memory to other nodes in the memory fabric as a fictitious local memory on the node, and may implement partial coherency for memory requests directed to the fictitious local memory. The fictitious local memory may have a memory address region different from a memory address region of a native local memory on the node.

17 Claims, 6 Drawing Sheets

(56) References Cited

U.S. PATENT DOCUMENTS

2015/0186215 A1* 7/2015 Das Sharma ....... G06F 11/1088
714/6.23
2016/0210471 A1* 7/2016 Aronovich ........ G06F 17/30115

OTHER PUBLICATIONS

Lyberis, S., "Myrmics: A Scalable Runtime System for Global Address Spaces," (Research Paper), Aug. 2013, 133 pages, available at http://myrmics.com/downloads/lyberis_phd_formic_myrmics_tr436.pdf.

* cited by examiner

PARTIAL CACHE COHERENCE

BACKGROUND

Processors may use a cache to speed up memory operations. The processor may read and write to the cache and may seldom access actual memory. It may read from actual memory if what it tries to read is not in the cache. Data in the cache may be written back to memory when the processor runs out of cache and that data needs to be evicted.

BRIEF DESCRIPTION OF THE DRAWINGS

The following detailed description references the drawings, wherein.

DETAILED DESCRIPTION

Figure 1:
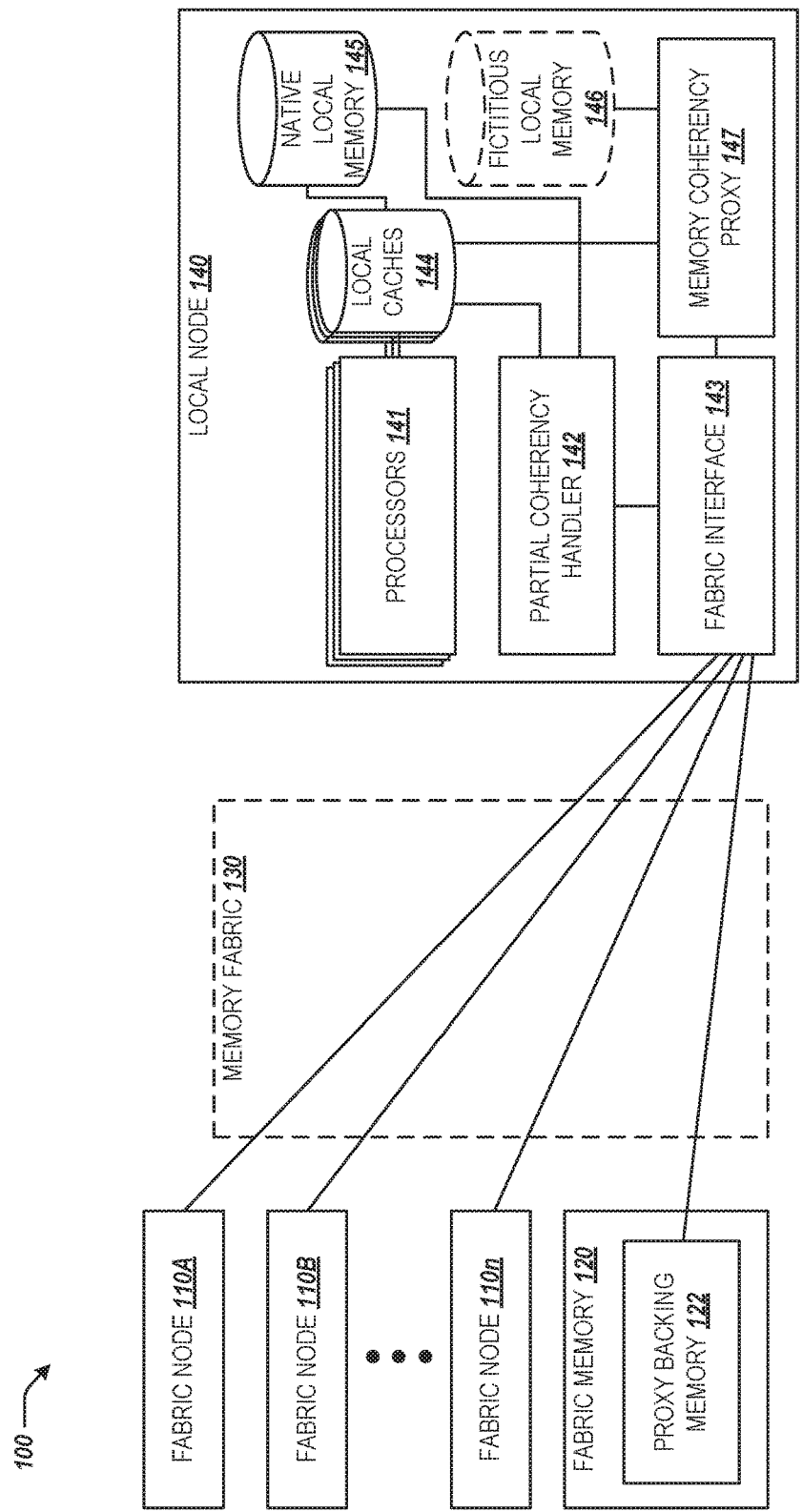
FIG. 1 is a block diagram of an example computing system for partial cache coherence.

In some situations, such as in multi-processor systems, multiple processors may want to write to and read from the same piece of memory. Each processor may see the result of memory operations done by the other processors so that the software distributed across the processors has a consistent view of memory and runs properly. On a coherent system, a cache coherency protocol may coordinate the processor caches. For example, the cache coherency protocol may ensure that different copies of a single memory location in the various caches have the same value and that any change done by one processor is propagated to the caches of the other processors.

Some computing systems, such as computing systems based on a memory fabric, may not have a cache coherency protocol and thus may not be coherent. Nodes in the memory fabric may be connected to each other and to a fabric memory pool via the memory fabric. Each node in the system may have a local cache coherency protocol internal to the node such that all the processors of the node are coherent with each other. However, any modification done in cache on the node is not automatically visible to other nodes of the system, and the node does not automatically see in its cache any modification done by the other nodes.

Examples disclosed herein describe technical solutions to these technical challenges by enabling a piece of fabric memory to be partially coherent with a node on the memory fabric, thereby enabling use of partially coherent memory beyond the limits of local memory. In some of the examples disclosed herein, a node on a memory fabric may include a memory coherency proxy that may configure a portion of a fabric memory on the memory fabric as a proxy backing memory. The memory coherency proxy may expose the proxy backing memory to other nodes in the memory fabric as a fictitious local memory on the node. The other nodes on the memory fabric may issue memory requests directed to the fictitious local memory via the memory fabric as if it were an actual local memory of the node. The memory coherency proxy may implement partial coherency for memory requests directed to the fictitious local memory by ensuring that accesses to the fictitious local memory are coordinated with the processor caches of the node. The node may receive the memory requests via the fabric. When memory requests are not satisfied using the processor caches of the node, the memory coherency proxy may translate the memory requests to memory requests directed to the proxy backing memory.

The following detailed description now refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram of an example computing system 100 for partial cache coherence. As shown in FIG. 1, computing system 100 may include a number of components, such as a plurality of nodes (i.e., fabric nodes 110A-110n and local node 140), a fabric memory 120, and a memory fabric 130. The number and arrangement of these components is an example only and provided for purposes of illustration. Other arrangements and numbers of components may be utilized without departing from the examples of the present disclosure. For example, computing system 100 may include any number of fabric nodes, local nodes, and fabric memories.

Computing system 100 may be highly scalable system. Each node (i.e., fabric node 11A-110n and local node 140) in computing system 100 may include a tightly coupled set of processors 141 and native local memory 145. Each node may function like a traditional computer; it may have its own operating system and a local memory domain that is fully coherent with all processors 141. It may also have its own power supply and own fault domain such that if one node fails or is shutdown, it will not directly affect other nodes.

In some implementations, computing system 100 may be a highly decentralized system. There may be no central point or common software kernel shared by the nodes; each node may have its own separate kernel. In other implementations, computing system 100 may be a tightly coupled system with a single operating system.

The nodes of computing system 100 may be connected using a high speed memory fabric 130. For example, memory fabric 130 may be an Infiniband-based memory fabric where the nodes connected via the memory fabric can issue remote direct memory access (RDMA) put/get commands to each other's local memories.

Memory fabric 130 may connect processors 141 of the nodes to a large pool of fabric memory 120. In some implementations, fabric memory 120 may be a global memory not attached to any specific node. In some implementations, fabric memory 120 may extended memory to a node, where the extended memory is attached to a node via memory fabric 130.

Memory fabric 130 may support simple memory operations on fabric memory 120. In some implementations, memory fabric 130 may not support native messaging and thus does not look like an Ethernet memory fabric. The nodes of computing system 100 may include a fabric interface 141 that does not implement complex protocols and does not implement receive queues that can be read from processors 141. In other implementations, such as Infiniband, memory fabric 130 may support both memory operations and native messaging.

Memory fabric 130 may also differ from some memory fabrics because the memory model does not support implicit coherency; it is not coherent. Two processors 141 in different local memory domains have a different view of fabric memory 120 unless they explicitly synchronize their use of that memory.

Each processor 141 may use a local cache 144 to speed up memory operations. Each processor 141 mostly reads and writes to its local cache 144, and in normal operation seldom accesses native local memory 145. It reads from native local memory 145 mostly if what it tries to read is not in its local cache 144. Data in local cache 144 is written back to native local memory 145 mostly when its processor 141 runs out of cache and that data need to be evicted.

Multiple processors 141 may want to read and write the same piece of native local memory 145, and each processor 141 may see the result of memory operations done by the other processors 141 so that the software distributed across processors 141 has a consistent view of native local memory 145 and runs properly. On a coherent system, a cache coherency protocol coordinates the local caches 144, it ensures the different copies of a single memory location in the various caches 144 always have the same value and that any change done by one processor 141 is propagated to the caches 144 on the other processors 141.

In some implementations, memory fabric 130 of computing system 100 may not have any cache coherency protocol and thus may not be coherent. Each node in computing system 100 may have a local cache coherency protocol internal to the node so all processors 141 of a single node are coherent with each other. Any modification done in local cache 144 on a node may not automatically visible to other nodes, and a node may not automatically see in its local cache 144 any modification done by other nodes.

One way to address the lack of coherency on memory fabric 130 is to use explicit coherency, where each node uses explicit cache operations. Prior to reading a shared memory, the node may invalidate its local cache 144 to make sure to read from actual memory. After writing to the shared memory, the node may flush its local cache 144 to make sure it is written to memory. In addition, the nodes may synchronize to make sure they are not writing to the memory simultaneously.

Explicit coherency, however, may be expensive to implement in terms of resource usage. So instead of using explicit coherency, computing system 100 may implement partial coherency, where native local memory 145 of each node may be globally exposed over memory fabric 130. This allows nodes to access the native local memory 145 of other nodes, to read it and write it. In addition, any remote access to the native local memory 145 of a node is made coherent on the node itself, those remote accesses are fully coordinated with the local caches 144 in the node.

The fabric interface 143 of a node implements a partial coherency handler 142. Partial coherency handler 142 may process all remote requests to the node's native local memory 145, and may be fully part of the cache coherency protocol of the node to coordinate remote accesses to its native local memory 145 with local caches 144. The domain of partial coherency may only include processor 141, native local memory 145, and fabric interface 143, and therefore it can remain processor specific. Partial coherency does not extend over memory fabric 130 so the overhead and complexity remains low.

Each remote node (i.e., fabric node 110A-110n) may still perform explicit cache operations when using a partially coherent memory of a local node 140, so they still have the same complexity and performance penalty as using regular non-coherent memory. The local node 140 does not have to use explicit cache operations, it can treat the shared part of native local memory 145 the same as any part of its native local memory 145. Its local caches 144 may be automatically coordinated with the remote accesses via partial coherency. For the local node 140, the performance of accessing the shared part of its native local memory 145 is the same as the rest of native local memory 145 and significantly better than accessing fabric memory 120.

Partial coherency is a tool that can improve the performance of many applications and frameworks. In particular, partial coherency is tremendously useful for messaging. In messaging, the use of memory is asymmetric, with the receiver doing a lot more memory operations that any of the senders. For that reason, the queues may be placed in the native local memory of the receiver. The receiver code servicing the queues performs many memory operations on the queues in the shared portion of the native local memory, and partial coherency allows most of those operations to be in the local processor cache instead of going over the memory fabric to a fabric memory. This improves latency and reduce the load on the memory fabric. In particular, in many cases the receiver may poll the receive queue to wait for a new message to be ready. Without partial coherency, this polling loop generates a stream of fabric accesses and is very inefficient. Partial coherency allows it to remain in the local processor cache, which is faster and has less overhead. Further, in some cases it is possible to transfer messages between nodes from cache to cache, without touching actual memory, speeding up further messaging.

One of the challenges with partial coherency is that it only applies to local memory. In order to be part of a partial coherency protocol of a node, the local memory is directly attached to the processor and the fabric interface of the node. The local memory offers the best performance for the local processor but lacks flexibility. Each node usually comes with a fixed and limited amount of local memory, and memory bus interfaces may support only a limited number of memory slots. This local memory is used for the local operating system, and many performance critical applications will want to use it. If partial coherency is limited to local memory, this increases contention on that memory.

Another challenge with partial coherency on local memory is that local memories often come in a limited number of types. For example, in some implementations, native local memory 145 may only be available in dynamic random access memory (DRAM). It may be much easier to offer a wider variety of memory types in fabric memory 120, which may include DRAM, various types of non-volatile memory (NVM), and other persistent memories.

Examples disclosed herein enable partial coherency in computing system 100 on pieces of fabric memory 120 so that the fabric memory 120 may be used, for example, for messaging. This enables a greater number of receive queues and persistent receive queues.

Moreover it enables nodes to implement partial coherency without memory directly attached to its processors 141, in other words without a native local memory 145. In such design, processors 141 only interface with memory fabric 130 and would not have any other memory interface. The node's dedicated memory may be on memory fabric 130. In some cases, the dedicated memory may be in the node, but only accessible via the memory fabric (extended memory).

A node in computing system 100 may access various types of fabric memory 120 via memory fabric 130, such as global memory and extended memory, which are often plentiful and flexible. Global memory is all the fabric memory attached directly on memory fabric 130 and not local to any node in computing system 100. Extended memory, on the other hand, is all the memory attached to a specific node via memory fabric 130. Extended memory is not global because it is attached to a node and it's not local because it is accessible only via memory fabric 130. Memory fabric 130 removes the limitation of local memory buses and allow a large amount of memory to be attached to memory fabric 130. A fabric interface library framework allows any amount of global memory to be allocated to a node on demand.

A node, such as local node 140, may include a memory coherency proxy 147 that implements partial coherency on a piece of fabric memory 120 and thus allows for the use of partial coherency beyond the limits of native local memory 145. Memory coherency proxy 147 may accept memory requests from other nodes in computing system 100 (i.e., fabric nodes 110A-110n) and redirect the requests to fabric memory 120 on memory fabric 130. Thus, partial cache coherence becomes a property of local node 140 instead of being a property of fabric memory 120. Trying to implement partial coherency in fabric memory 120 itself is problematic because it forces a tight linkage between the node in computing system 100 and fabric memory 120. Instead, partial cache coherence may be implemented entirely in local node 140, and all memory accesses to fabric memory 120 may go through local node 140 first, where partial coherency can be implemented by having local node 140 masquerading a piece of fabric memory 120 as a piece of local memory.

The set of memory operations supported by memory coherency proxy 147 may be the same as, or similar to, those supported by partial coherency handler 142. This includes reading and writing entire cache lines as well as various atomic operations. In some implementations, this may include reading and writing individual bytes or words. Memory coherency proxy 147 may be a combination of hardware and software instructions executed by the hardware and may be implemented, depending on the architecture of processor 141, by fabric interface 143, in a memory controller (not shown) of local node 140, and/or in local caches 144. For example, memory coherency proxy 147 may be implemented by an application-specific integrated circuit (ASIC), a field-programmable gate array (FPGA), or a hardware processor that executes the functions of memory coherency proxy 147 described herein.

Local node 140 may expose a portion of fabric memory 120 on memory fabric 130 as a fictitious local memory 146. Local node 140 may use memory coherency proxy 147 to transform accesses to fictitious local memory 146 into accesses to the piece of fabric memory 120 on memory fabric 130. Memory coherency proxy 147 may configure the portion of fabric memory 120 as a proxy backing memory 122. Fictitious local memory 146 and proxy backing memory 122 may use different addresses to so that all memory access to proxy backing memory 122 go through local node 140. Because all access to fictitious local memory 146 goes through memory coherency proxy 147, it can implement partial coherency for fictitious local memory 146. In some implementations, memory coherency proxy 147 may configure and expose a plurality of fictitious local memories 146 on memory fabric 130. Each fictitious local memory 146 may be managed independently by memory coherency proxy 147 and may be mapped to a different proxy backing memory 122 in fabric memory 120.

Memory coherency proxy 147 may receive memory requests from both remote nodes (i.e., fabric nodes 110A-110n) and from processors 141 on local node 140. Memory coherency proxy 147 makes sure each request is properly coordinated with the processors' 141 local caches 144. If a request can be serviced using one of the processor's 141 local caches 144, memory coherency proxy 146 may satisfy that memory request without consulting proxy backing memory 122. Otherwise, memory coherency proxy 147 may generate a memory request to proxy backing memory 122 to satisfy the original memory request.

The remote nodes cannot differentiate between the native local memory 145 and the fictitious local memory 146 exposed by local node 140 on memory fabric 130. They both behave the same general properties, apart from higher latency for fictitious local memory 146, so it is totally transparent to the remote nodes. Fabric memory 120 is completely unmodified and is not aware it is being used by memory coherency proxy 147 as a fictitious local memory 146. Memory fabric 130 and the fabric protocol are also unmodified.

To create a fictitious local memory 146, memory coherency proxy 147 may gain exclusive access to a piece of fabric memory 120 so that it can be configured as proxy backing memory 122. The access may be exclusive so that other nodes in computing system 100 do not access proxy backing memory as it would bypass the enforcement of partial coherency by memory coherency proxy 147, thereby breaking partial coherency for proxy backing memory 122. Gaining exclusive access to proxy backing memory 122 may be done at the hardware level, using some kind of firewall or access control list either in memory fabric 130 or the fabric memory 120. Exclusivity may also be achieved at the software level, by getting an exclusive allocation in the fabric memory management framework (the librarian). The benefits of a software solution are that it is more flexible, scalable, and simpler and is appropriate because there are few security implications.

Once the portion of fabric memory 120 has been configured as proxy backing memory 122, local node 140 may expose fictitious memory region 146 on memory fabric 130.

In most cases, local node 140 already exposes to memory fabric 130 some part of its native local memory 145 via partial coherency handler 142. Memory coherency proxy 147 exposes fictitious local memory 146 to the memory fabric 130 and to the other nodes such that it appears that local node 140 has more shared local memory than it really has attached to it, by either exposing more memory regions or a larger memory region. The memory address region of fictitious memory 146 may be some memory address region that is not already mapped to some existing memory, local, extended or global. In particular it is a new memory address region that is different from the memory address region of proxy backing memory 122 and native local memory 145. It would be possible to use the same or overlapping memory address regions for both fictitious local memory 146 and proxy backing memory region 122, but that would cause a change the memory fabric topology (distinct paths) or result in forwarding (route based on both destination and source address). Using distinct memory addresses allows the proxy to be transparent to memory fabric 130. The size of fictitious local memory 146 may be represented as the same size as is allocated to proxy backing memory 122.

With proxy backing memory 122 and fictitious local memory 146 both configured, memory coherency proxy 147 may receive memory access requests for fictitious local memory 146 (e.g., from fabric nodes 110A-110n) and may translate them to access to proxy backing memory 122 and local caches 144. Instead of doing a local memory access via a local memory bus, memory coherency proxy 147 may perform memory accesses over memory fabric 130 to proxy backing memory 122. Memory coherency proxy 147 takes part in the cache coherency protocol of local node 140, so any access to fictitious local memory 146 is partially coherent.

If local node 140 wants to use a sequence of bytes, such as a buffer or memory object, in a partially coherent way with other nodes in computing system 100, it may allocate it in fictitious local memory 146, assign a pointer to the sequence of bytes in fictitious local memory 146, and share the pointer with the other nodes. When a node wants to perform a memory access to the sequence of bytes, it does so based on the pointer. It may compute a fictitious memory address (FMA) from the pointer. Since the computed FMA is not local to the requesting node, the requesting node generates a memory fabric request to the FMA. The FMA is part of fictitious local memory 147 on local node 140 (i.e., it is within the memory address region of fictitious local memory 147), so the memory request is routed to local node 140 via memory fabric 130. It is not routed to directly to proxy backing memory 122, because the FMA is not part of the proxy backing memory region of proxy backing memory 122.

When fabric interface 143 of local node 140 receives the memory request, it identifies it as part of fictitious local memory 146 based on the FMA and passes the memory request to memory coherency proxy 147. Memory coherency proxy 147 may first attempt to satisfy the memory request using local processor caches 144 as dictated by the partial coherency protocol of local node 140. If the memory request is a read, and a local cache 144 has a copy of the FMA, the memory coherency proxy may read the value from the local cache 144. If the memory request is a write with a writeback option, and some local caches 144 have a copy of the FMA, memory coherency proxy 147 may update the value in all these local caches 144. If the memory request is a write with the bypass option, and some local caches 144 have a copy of the FMA, memory coherency proxy 147 may invalidate the FMA in all these local caches 144. In this case, the memory request is not satisfied and goes to proxy backing memory 122. If a local cache 144 can satisfy the memory request, memory coherency proxy 147 uses the local cache 144 to satisfy the memory request.

If the memory request cannot be satisfied in the local processor caches 144, memory coherency proxy 147 may forward the memory request to proxy backing memory 122. To forward the memory request, memory coherency proxy 147 may compute a proxy backing memory address (PBMA) by translating the FMA in the fictitious local memory 146 into the PBMA. The translation may be accomplished by, for example, adding or subtracting a constant offset. Once the FMA has been translated into the PBMA, memory coherency proxy 147 may copy the original memory request, replace FMA with PBMA, replace the source address by its own address, and then issue the new memory request to proxy backing memory 122 via memory fabric 130. Fabric memory 120 answers the request and returns an answer to memory coherency proxy 147. Upon receiving the answer from fabric memory 120, memory coherency proxy 147 may return the answer to the requesting node that issued the memory request to satisfy the request.

Accordingly, the implementation of partial coherency on fabric memory 120 by memory coherency proxy 147 allows local node 140 to take a piece of extended or global memory and re-export it as if it was a part of its own native local memory 145. Memory coherency proxy 147 implements partial coherency for fictitious local memory 146 by making sure that remote accesses to fictitious local memory 146 are coordinated with the various local processor caches 144 of local node 140. When a memory request is not satisfied by the local caches 144, memory coherency proxy 147 generates memory access requests to the extended or global memory to satisfy memory access to fictitious local memory 146.

Figure 2:
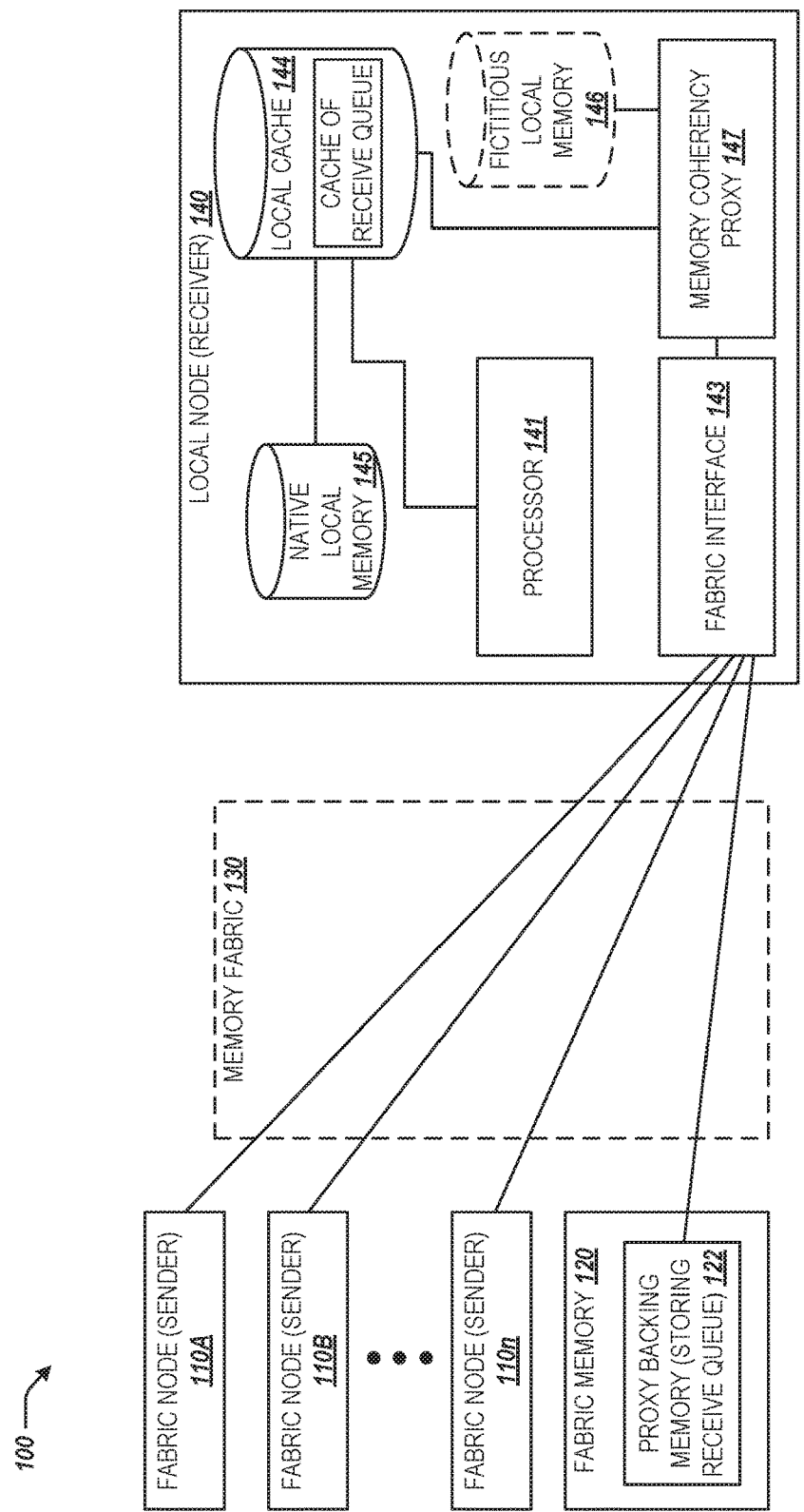
FIG. 2 is an example illustration of an implementation of the computing system illustrated in FIG. 1.

FIG. 2 is an example illustration of partial cache coherence on fabric memory 120 in computing system 100. The example illustration illustrates how memory coherency proxy 147 can implement NVM-backed high performance messaging. For purposes of simplicity in illustrating the example, some elements of local node 140 may be absent from FIG. 2.

In the example, a distributed modular application may be deployed on computing system 100. To provide fault tolerance and fault isolation, the application modules may communicate via fault tolerant messaging. This messaging may occur over memory fabric 130 between the nodes (i.e., fabric nodes 110A-110n and local node 140) in computing system 100. The messaging framework is set up to provide a set of pair-wise messaging queues connecting each pair of application modules. Each module has a set of receive queues allowing each other module to send messages to it. For simplicity of illustration a single queue is described in the example and is attached to a module, this module is the receiver (local node 140). The module that is allowed to add messages to this queue is the sender (fabric nodes 110A-110n).

One of the stipulations of the messaging framework of memory fabric 130 requirement is that messages are never lost before being fully processed by the receiver, even if the receiver node hardware fails or is hot-swapped. One way to address this is to build a high-level messaging protocol with acknowledgements and retransmissions, where the sender retries a message until it is properly acknowledged. This, however, adds complexity in the messaging layer and the acknowledgements add overhead over memory fabric 130.

Another way to address this is to locate the receive queue in a NVM (proxy backing memory 122 of fabric memory 120) located on memory fabric 130. This memory is properly decoupled from the receiver node, so it won't be impacted if the receiver fails. The persistent nature of the memory protects it from power losses.

Locating the receive queue in proxy backing memory 122 has performance impact, however, the performance impact can be minimized using memory coherency proxy 147. If memory coherency proxy 147 is not used, the performance of the receiver is greatly impacted. For example, to check if a new packet is ready in the receive queue, the receiver has to poll the receive queue by generating a stream of read requests over memory fabric 130, which adds overhead on memory fabric 130 and is significantly slower than polling native local memory 145.

The receiver may configure memory coherency proxy 147 to remap the receive queue in proxy backing memory 122 as a fictitious local memory 146 on the receiver, and may communicate the address of the receive queue in fictitious local memory 146 to the various senders of computing system 100.

When the sender wants to add a message to the receive queue, it issues a series of write operations over memory fabric 130 to write the message in the receive queue within fictitious local memory 146. The write operations may have a cache bypass option, which makes sure they are propagated to proxy backing memory 122 and are not trapped in the local cache 144 of the receiver. Memory coherency proxy 147 may receive the write requests, invalidate the corresponding cache lines in local cache 144, and then may issue corresponding write requests to proxy backing memory 122 so that the message is stored in the receive queue.

When the receiver wants to check if a new message has arrived in the receive queue, it issues a read request via processor 141 on the receive queue within fictitious local memory 146 to see if the receive queue has changed. To minimize latency, these checks may be executed frequently. If nothing has been written since the last read and no cache eviction or invalidation has been performed, the target of the read request is still present in local cache 144. Therefore the read is replied by the local cache 144 and no actual read request is issued over memory fabric 130. Thus, in this scenario, memory coherency proxy 147 reduces the amount of read requests that are sent over memory fabric 130, thereby reducing overhead on memory fabric 130.

When the sender writes a message to the receive queue, the associated cache line in local cache 144 is invalidated in the process. The next time the receiver checks the receive queue by reading it the read request is issued over memory fabric 130 by memory coherency proxy 147 and the new value is read from proxy backing memory 122 because the cache line was invalidated when the message was written to the receive queue. After seeing that the read value has changed, the receiver can read the rest of the message. Once the message is fully processed, the receiver can erase the message from the receive queue with a set of write operations with a cache bypass option to make sure the actual proxy backing memory 122 is erased. If the receiver fails at any point before fully erasing the message, the message is preserved in the proxy backing memory 122, and a subsequent instance of the receiver can read it and process it.

Figure 3:
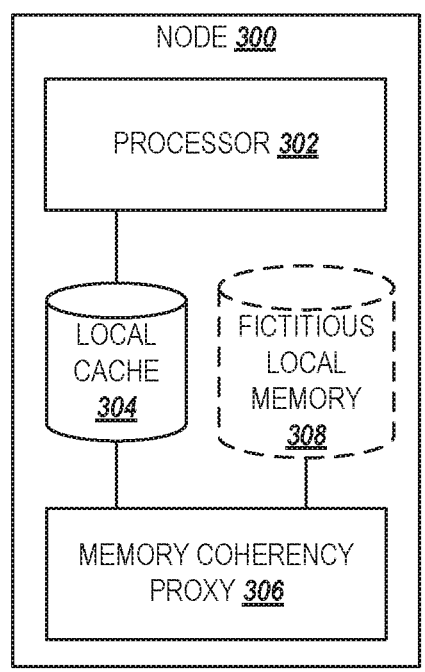
FIG. 3 is a block diagram of an example node for partial cache coherence.

FIG. 3 is a block diagram of a node 300 for partial cache coherence. As shown in FIG. 3, node 300 may include a number of components, such as a processor 302, a local cache 304, a memory coherency proxy 306, and a fictitious local memory 308. The number and arrangement of these components is an example only and provided for purposes of illustration. Other arrangements and numbers of components may be utilized without departing from the examples of the present disclosure. In some implementations, local node 140 of FIG. 1 may implement node 300, and accordingly processor 141 may implement processor 302, local caches 144 may implement local cache 304, memory coherency proxy 147 may implement memory coherency proxy 306, and fictitious local memory 146 may implement fictitious local memory 308.

In some implementations, node 300 may be included in a memory fabric (e.g., memory fabric 130 of FIGS. 1 and 2). As shown in FIG. 3, local cache 304 may be connected to local processor 302. Memory coherency proxy 306 may configure a portion of a fabric memory (e.g., fabric memory 120 of FIGS. 1 and 2) on the memory fabric as a proxy backing memory (e.g., proxy backing memory 122 of FIGS. 1 and 2). Memory coherency proxy 306 may expose the proxy backing memory to other nodes (e.g., fabric nodes 110A-110n of FIGS. 1 and 2) in the memory fabric as fictitious local memory 308 on node 300. Fictitious local memory 308 may have a memory address region different from a memory address region of a native local memory (e.g., native local memory 145 of FIGS. 1 and 2) of node 300.

In some implementations, memory coherency proxy 306 may translate memory addresses in memory requests directed to fictitious local memory 308 from memory addresses in the memory address region of fictitious local memory 308 to memory addresses of the proxy backing memory. Memory coherency proxy 306 may generate memory requests to the proxy backing memory that include the memory addresses of the proxy backing memory and may provide the generated memory requests to the proxy backing memory over the memory fabric.

In some implementations, node 300 may include a fabric interface (e.g., fabric interface 143 of FIGS. 1 and 2). The fabric interface may receive a memory request, determine that the memory request is directed to a memory address region of fictitious local memory 308, and in response to determining that the memory request is directed to the memory address region of fictitious local memory 308, provide the memory request to memory coherency proxy 306. Memory coherency proxy 306 may satisfy the memory request using local cache 304 and, if unable to satisfy the memory request using local cache 304, forward the memory request to the proxy backing memory.

If the memory request is a read request, memory coherency proxy 306 may satisfy the read request using local cache 304 by determining that local cache 304 includes a memory address in the memory address region of fictitious local memory 308, and in response to determining that local cache 304 includes a memory address in the memory address region of fictitious local memory 308, reading contents of the memory address from local cache 304. If the memory request is a write request, memory coherency proxy 306 may satisfy the write request using 304 local cache by determining that local cache 304 includes a memory address in the memory address region of fictitious local memory 308, and in response to determining that local cache 304 includes a memory address in the memory address region of fictitious local memory 308, updating contents of the memory address in local cache 304.

In some implementations, memory coherency proxy 306 may assign a pointer to a sequence of bytes in fictitious local memory 308 and share the pointer with the other nodes in the memory fabric. Memory coherency proxy 306 may receive a memory request to access the sequence of bytes from another node in the memory fabric. The memory request may include a memory address in the memory address region of fictitious local memory 308 computed from the pointer. Memory coherency proxy 306 may attempt to satisfy the memory request to access the sequence of bytes using local cache 304 by determining whether local cache 304 includes a copy of the memory address included in memory request. In response to being unable to satisfy the memory request using local cache 304, memory coherency proxy 306 may compute a memory address in the proxy backing memory from the memory address in the memory address region of fictitious local memory 308 included in the memory request. Memory coherency proxy 306 may modify the memory request by replacing the memory address included the memory request with the computed memory address in the proxy backing memory and replacing a source address of the requesting node in the memory request with a source address of node 300. Memory coherency proxy 306 may issue the modified memory request to the proxy backing memory over the memory fabric. Memory coherency proxy 306 may compute the memory address in the proxy backing memory by adding or subtracting a constant offset from the memory address in the memory address region of fictitious local memory 308 included in the memory request.

Figure 4:
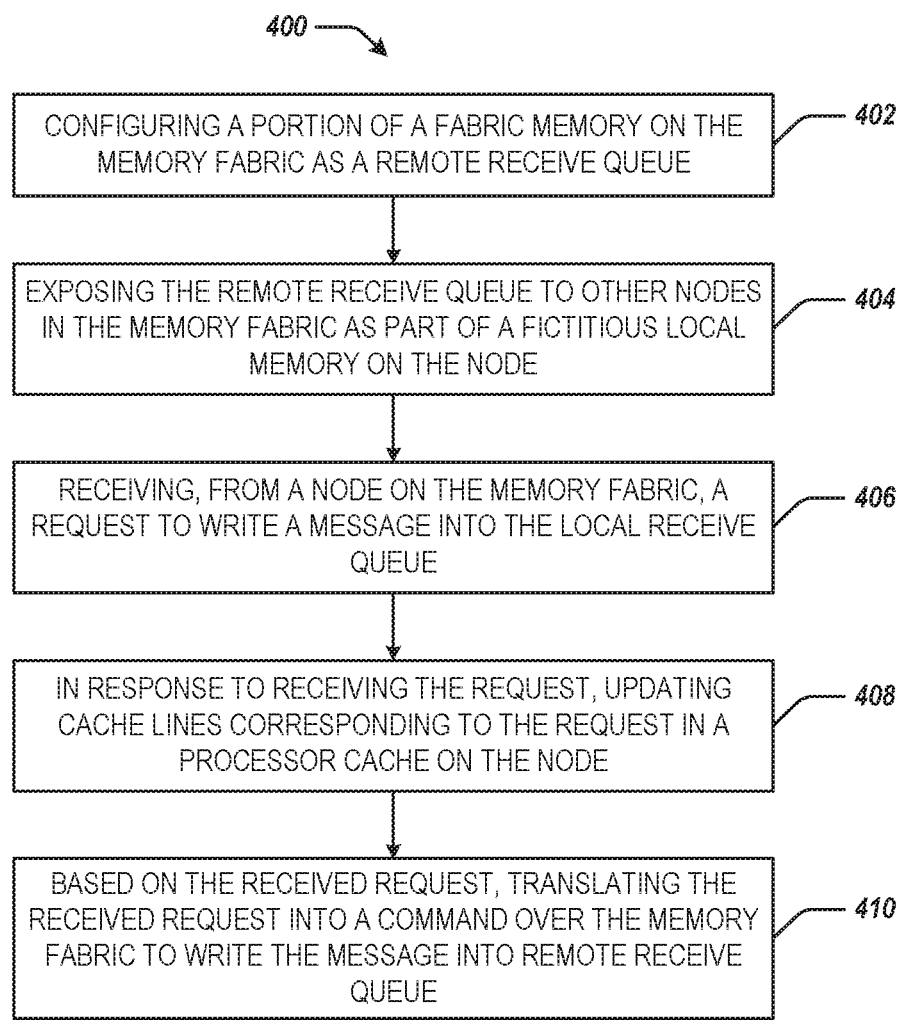
FIG. 4 is a flowchart of an example method for partial cache coherence.

FIG. 4 is a flowchart depicting an example method 400 for partial cache coherence. Method 400 may be executed or performed, for example, by some or all of the system components described above in computing system 100 of FIGS. 1 and 2. For example, method 400 may be performed by local node 140 of FIGS. 1 and 2. Moreover, method 400 may be performed by node 300 of FIG. 3. Other suitable systems may be used as well. Method 400 may be implemented in the form of executable instructions stored on a machine-readable storage medium of the node and executed by at least one processor, ASIC, FPGA, etc., of the node. Alternatively or in addition, method 400 may be implemented in the form of electronic circuitry (e.g., hardware). In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, method 400 may include configuring a portion of a fabric memory on a memory fabric as a remote receive queue. As an example, memory coherency proxy 147 of FIGS. 1 and 2, and/or memory coherency proxy 306 of FIG. 3 may be responsible for implementing block 402.

At block 404, method 400 may include exposing the remote receive queue to other nodes in the memory fabric as part of a fictitious local memory on the node. As an example, memory coherency proxy 147 of FIGS. 1 and 2, and/or memory coherency proxy 306 of FIG. 3 may be responsible for implementing block 404.

At block 406, method 400 may include receiving, from a node on the memory fabric, a request to write a message into the remote receive queue. As an example, memory coherency proxy 147 of FIGS. 1 and 2, and/or memory coherency proxy 306 of FIG. 3 may be responsible for implementing block 406.

At block 408, method 400 may include in response to receiving the request, updating cache lines corresponding to the request in a processor cache on the node. As an example, memory coherency proxy 147 of FIGS. 1 and 2, and/or memory coherency proxy 306 of FIG. 3 may be responsible for implementing block 408.

At block 410, method 400 may include based on the received request, translating the received request into a command over the memory fabric to write the message into receive queue. As an example, memory coherency proxy 147 of FIGS. 1 and 2, and/or memory coherency proxy 306 of FIG. 3 may be responsible for implementing block 410.

Figure 5:
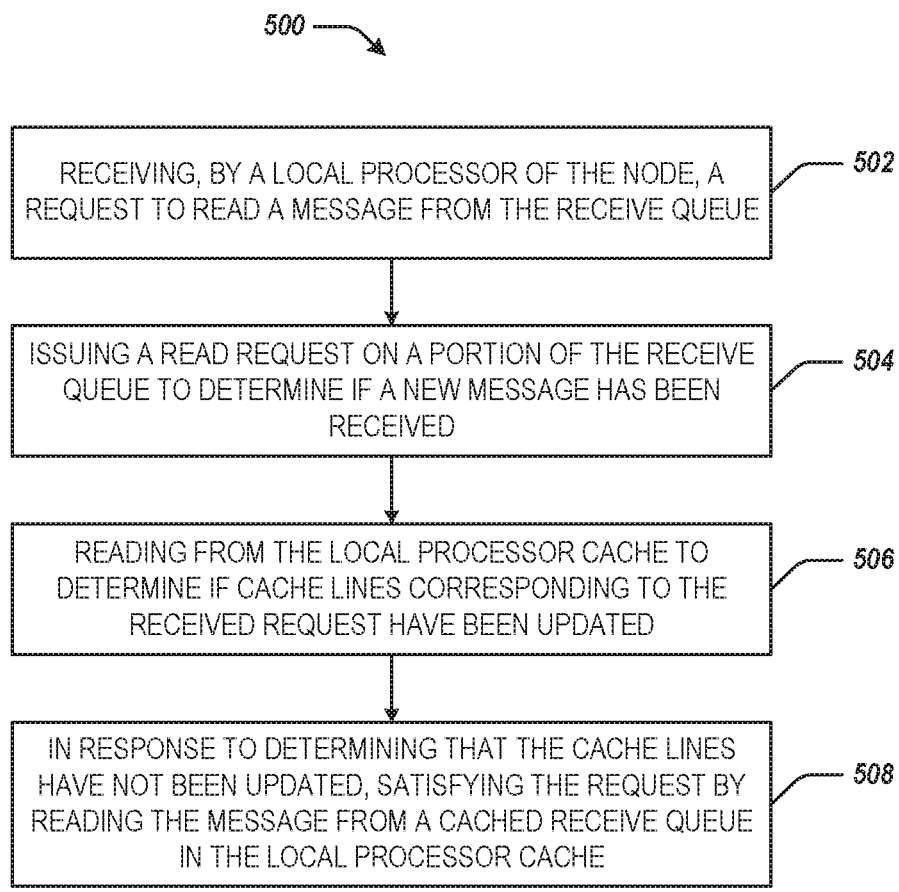
FIG. 5 is a flowchart of an example method for partial cache coherence.

FIG. 5 is a flowchart depicting an example method 500 for partial cache coherence. Method 500 may be executed or performed, for example, by some or all of the system components described above in computing system 100 of FIGS. 1 and 2. For example, method 500 may be performed by local node 140 of FIGS. 1 and 2. Moreover, method 500 may be performed by node 300 of FIG. 3. Other suitable systems may be used as well. Method 500 may be implemented in the form of executable instructions stored on a machine-readable storage medium of the node and executed by at least one processor, ASIC, FPGA, etc., of the node. Alternatively or in addition, method 500 may be implemented in the form of electronic circuitry (e.g., hardware). In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat. In some examples, method 500 may be performed as a standalone method are as part of other partial cache coherence methods such as method 400 of FIG. 4.

At block 502, method 500 may include receiving, by a local processor of a node connected to a memory fabric, a request to read a message from a receive queue. The receive queue may be stored in a fabric memory remote to the node on the memory fabric. As an example, memory coherency proxy 147 of FIGS. 1 and 2, and/or memory coherency proxy 306 of FIG. 3 may be responsible for implementing block 502.

At block 504, method 500 may include issuing a read request on a portion of the receive queue to determine if a new message has been received. As an example, memory coherency proxy 147 of FIGS. 1 and 2, and/or memory coherency proxy 306 of FIG. 3 may be responsible for implementing block 504.

At block 506, method 500 may include reading from the local processor cache to determine if cache lines corresponding to the received request have been updated. As an example, memory coherency proxy 147 of FIGS. 1 and 2, and/or memory coherency proxy 306 of FIG. 3 may be responsible for implementing block 506.

At block 508, method 500 may include in response to determining that the cache lines have not been updated, satisfying the request by reading the message from a cached receive queue in the local processor cache. As an example, memory coherency proxy 147 of FIGS. 1 and 2, and/or memory coherency proxy 306 of FIG. 3 may be responsible for implementing block 508.

Figure 6:
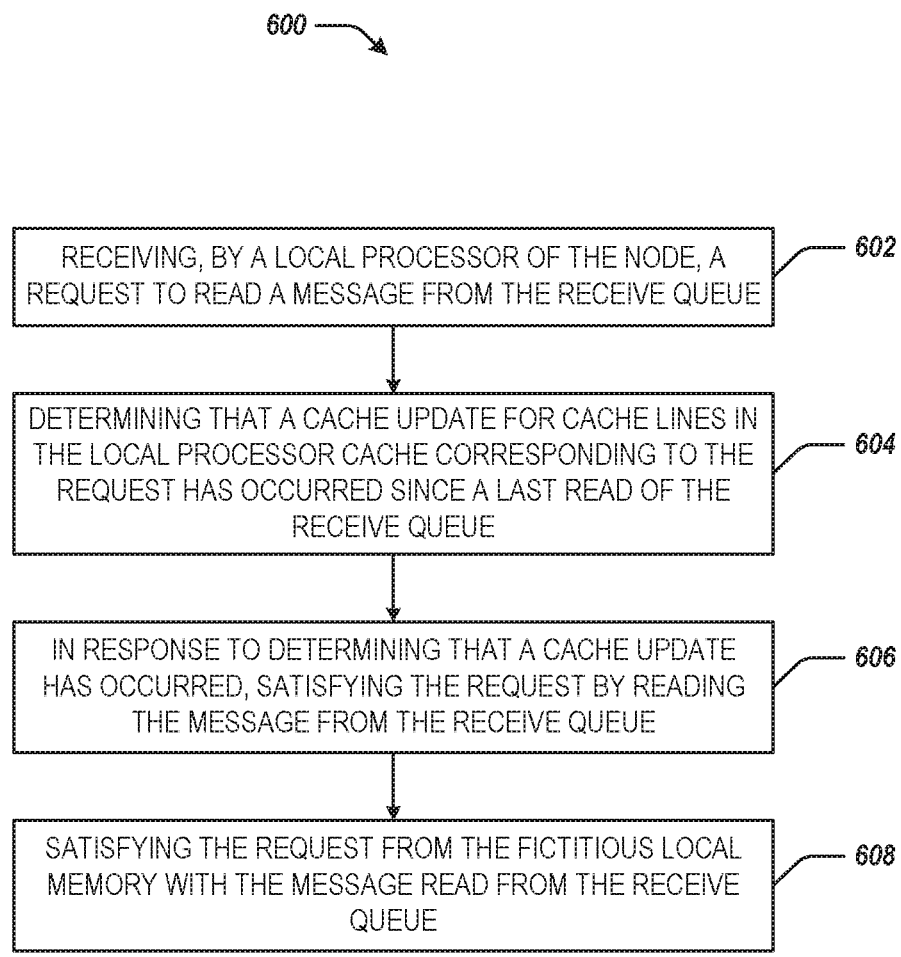
FIG. 6 is a flowchart of an example method for partial cache coherence.

FIG. 6 is a flowchart depicting an example method 600 for partial cache coherence. Method 600 may be executed or performed, for example, by some or all of the system components described above in computing system 100 of FIGS. 1 and 2. For example, method 600 may be performed by local node 140 of FIGS. 1 and 2. Moreover, method 600 may be performed by node 300 of FIG. 3. Other suitable systems may be used as well. Method 600 may be implemented in the form of executable instructions stored on a machine-readable storage medium of the node and executed by at least one processor, ASIC, FPGA, etc., of the node. Alternatively or in addition, method 600 may be implemented in the form of electronic circuitry (e.g., hardware). In some examples, steps of method 600 may be executed substantially concurrently or in a different order than shown in FIG. 6. In some examples, method 600 may include more or less steps than are shown in FIG. 6. In some examples, some of the steps of method 600 may, at certain times, be ongoing and/or may repeat. In some examples, method 600 may be performed as a standalone method are as part of other partial cache coherence methods such as method 400 of FIG. 4.

At block 602, method 600 may include receiving, by a local processor of a node connected to a memory fabric, a request to read a message from a receive queue. The receive queue may be stored in a fabric memory remote to the node on the memory fabric. As an example, memory coherency proxy 147 of FIGS. 1 and 2, and/or memory coherency proxy 306 of FIG. 3 may be responsible for implementing block 602.

At block 604, method 600 may include determining that a cache update for cache lines in the local processor cache corresponding to the request has occurred since a last read of the receive queue. As an example, memory coherency proxy 147 of FIGS. 1 and 2, and/or memory coherency proxy 306 of FIG. 3 may be responsible for implementing block 604.

At block 606, method 600 may include in response to determining that a cache update has occurred, satisfying the request by reading the message from the receive queue. As an example, memory coherency proxy 147 of FIGS. 1 and 2, and/or memory coherency proxy 306 of FIG. 3 may be responsible for implementing block 606.

At block 608, method 600 may include satisfying the request from the fictitious local memory with the message read from the receive queue. As an example, memory coherency proxy 147 of FIGS. 1 and 2, and/or memory coherency proxy 306 of FIG. 3 may be responsible for implementing block 608.

The foregoing disclosure describes a number of example implementations for partial cache coherence. The disclosed examples may include systems, devices, computer-readable storage media, and methods for partial cache coherence. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 4-6 is an example and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A node included in a memory fabric, comprising:
a local cache connected to a local processor;
a memory coherency proxy to:
configure a portion of a fabric memory on the memory fabric as a proxy backing memory, wherein the fabric memory is at least one of a global memory attached to the memory fabric, an extended memory attached to the node via the memory fabric, and a local memory of another node on the fabric;
expose the proxy backing memory to other nodes in the memory fabric as a fictitious local memory on the node having a memory address region different from a memory address region of a native local memory; and
implement partial coherency for memory requests directed to the fictitious local memory.

2. The node of claim 1, wherein the memory coherency proxy is to:
translate memory addresses in memory requests directed to the fictitious local memory from memory addresses in the memory address region of the fictitious local memory to memory addresses of the proxy backing memory.

3. The node of claim 2, wherein the memory coherency proxy is to:
generate memory requests to the proxy backing memory that include the memory addresses of the proxy backing memory; and
provide the generated memory requests to the proxy backing memory over the memory fabric.

4. The node of claim 1, comprising:
a fabric interface to:
receive a memory request;
determine that the memory request is directed to the memory address region of the fictitious local memory; and
in response to determining that the memory request is directed to the memory address region of the fictitious local memory, provide the memory request to the memory coherency proxy.

5. The node of claim 4, wherein the memory coherency proxy is to:
satisfy the memory request using the local cache; and
if unable to satisfy the memory request using the local cache, forward the memory request to the proxy backing memory.

6. The node of claim 5, wherein the memory request is a read request and the memory coherency proxy is to satisfy the read request using the local cache by:
determining that the local cache includes a memory address in the memory address region of the fictitious local memory; and
in response to determining that the local cache includes a memory address in the memory address region of the fictitious local memory, reading contents of the memory address from the local cache.

7. The node of claim 5, wherein the memory request is a write request and the memory coherency proxy is to satisfy the write request using the local cache by:
determining that the local cache includes a memory address in the memory address region of the fictitious local memory; and in response to determining that the local cache includes a memory address in the memory address region of the fictitious local memory, updating contents of the memory address in the local cache.

8. The node of claim 5, wherein the memory request is a write request and the memory coherency proxy is to satisfy the write request using the local cache by:
determining that the local cache includes a memory address in the memory address region of the fictitious local memory; and
in response to determining that the local cache includes a memory address in the memory address region of the fictitious local memory, invalidating contents of the memory address in the local cache.

9. The method of claim 8, wherein the request to write the message into the receive queue is a write request with a cache bypass option.

10. A method for partial cache coherence, the method performed by a memory coherency proxy in a node on a memory fabric, the method comprising:
configuring a portion of a fabric memory on the memory fabric as a receive queue;
exposing the receive queue to other nodes in the memory fabric as part of a fictitious local memory on the node;
receiving, from a node on the memory fabric, a request to write a message into the receive queue;
in response to receiving the request, updating cache lines corresponding to the request in a local processor cache on the node;
based on the received request, translating the received request into a command over the memory fabric to write the message into receive queue;
receiving, by a local processor of the node, a request to read a message from the receive queue;
determining that a cache update for cache lines in the local processor cache corresponding to the request has occurred since a last read of the receive queue; and
in response to determining that a cache update has occurred, satisfying the request by reading the message from the receive queue.

11. The method of claim 10, comprising:
satisfying the request from the fictitious local memory with the message read from the receive queue.

12. A node included in a memory fabric, comprising:
a local cache connected to a local processor; and
a memory coherency proxy to:
configure a portion of remote fabric memory on the memory fabric as a proxy backing memory;
expose the proxy backing memory to other nodes in the memory fabric as a fictitious local memory on the node having a memory address region different from a memory address region of a native local memory;
assign a pointer to a sequence of bytes in the fictitious local memory;
share the pointer with the other nodes in the memory fabric; and
receive a memory request to access the sequence of bytes from another node in the memory fabric, the memory request including a memory address in the memory address region of the fictitious local memory computed from the pointer.

13. The node of claim 12, wherein the memory coherency proxy to:
attempt to satisfy the memory request to access the sequence of bytes using the local cache by determining whether the local cache includes a copy of the memory address included in memory request.

14. The node of claim 13, wherein the memory coherency proxy to:
in response to being unable to satisfy the memory request using the local cache, compute a memory address in the proxy backing memory from the memory address in the memory address region of the fictitious local memory included in the memory request.

15. The node of claim 14, wherein the memory coherency proxy to:
modify the memory request by;
replacing the memory address included the memory request with the computed memory address in the proxy backing memory; and
replacing a source address of the other node in the memory request with a source address of the node; and
issue the modified memory request to the proxy backing memory over the memory fabric.

16. The node of claim 14, wherein the memory coherency proxy to compute the memory address in the proxy backing memory by adding or subtracting a constant offset from the memory address in the memory address region of the fictitious local memory included in the memory request.

17. A method for partial cache coherence, the method performed by a memory coherency proxy in a node on a memory fabric, the method comprising:
configuring a portion of a fabric memory on the memory fabric as a receive queue;
exposing the receive queue to other nodes in the memory fabric as part of a fictitious local memory on the node;
receiving, from a node on the memory fabric, a request to write a message into the receive queue;
in response to receiving the request, updating cache lines corresponding to the request in a local processor cache on the node;
based on the received request, translating the received request into a command over the memory fabric to write the message into receive queue;
receiving, by a local processor of the node, a request to read a message from the receive queue;
issuing a read request on a portion of the receive queue to determine if a new message has been received;
reading from the local processor cache to determine if cache lines corresponding to the received request have been updated; and
in response to determining that the cache lines have not been updated, satisfying the request by reading the message from a cached receive queue in the local processor cache.

* * * * *